US007672746B1

(12) United States Patent
Hamilton et al.

(10) Patent No.: US 7,672,746 B1
(45) Date of Patent: Mar. 2, 2010

(54) SYSTEMS AND METHODS FOR AUTOMATIC SCHEDULING OF A WORKFORCE

(75) Inventors: Edward Hamilton, San Jose, CA (US); Jason Fama, Foster City, CA (US); Mike Bourke, San Francisco, CA (US)

(73) Assignee: Verint Americas Inc., Melville, NY (US)

( * ) Notice: Subject to any disclaimer, the term of this patent is extended or adjusted under 35 U.S.C. 154(b) by 548 days.

(21) Appl. No.: 11/396,063

(22) Filed: Mar. 31, 2006

(51) Int. Cl.
*G06F 19/00* (2006.01)
(52) U.S. Cl. .......................... 700/100; 700/111; 705/8
(58) Field of Classification Search ........... 700/99–100, 700/107, 16; 705/8–9, 78, 28, 14; 707/102; 379/265; 709/226, 229
See application file for complete search history.

(56) References Cited

U.S. PATENT DOCUMENTS

| | | | |
|---|---|---|---|
| 3,594,919 A | 7/1971 | De Bell et al. | |
| 3,705,271 A | 12/1972 | De Bell et al. | |
| 4,510,351 A | 4/1985 | Costello et al. | |
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,325,292 A | 6/1994 | Crockett | |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |

(Continued)

FOREIGN PATENT DOCUMENTS

| | | |
|---|---|---|
| EP | 0453128 A2 | 10/1991 |
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

WWW.findartical.com.*

(Continued)

*Primary Examiner*—Kidest Bahta (57) ABSTRACT

Systems and methods are disclosed for scheduling overtime and time-off for a workforce. In one embodiment, the method comprises: receiving a workforce schedule including assignments of workers to shifts; receiving a template describing alterations to shifts; and applying schedulable objects to the workforce schedule in accordance with a workload forecast and schedule constraints. In one embodiment, the system comprises: a user interface and a scheduler. The user interface allows creation of shift alteration templates and associating templates with workers. The scheduler uses the shift alteration templates to modify an existing schedule of assignments of workers to shifts.

20 Claims, 11 Drawing Sheets

U.S. PATENT DOCUMENTS

| | | |
|---|---|---|
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,911,134 A | 6/1999 | Castonguay et al. |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,044,355 A | 3/2000 | Crockett et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,415,259 B1 * | 7/2002 | Wolfinger et al. ............... 705/8 |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,628,777 B1 | 9/2003 | McIllwaine et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 6,970,829 B1 * | 11/2005 | Leamon ..................... 705/9 |
| 2001/0000962 A1 | 5/2001 | Rajan |
| 2001/0032335 A1 | 10/2001 | Jones |
| 2001/0043697 A1 | 11/2001 | Cox et al. |
| 2002/0023157 A1 * | 2/2002 | Lo et al. ..................... 709/227 |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2004/0193473 A1 * | 9/2004 | Robertson et al. ............ 705/9 |
| 2004/0193972 A1 * | 9/2004 | Mitlin et al. ................ 714/704 |
| 2004/0267591 A1 | 12/2004 | Hedlund et al. |

| | | | | |
|---|---|---|---|---|
| 2004/0267595 | A1* | 12/2004 | Woodings et al. ............... | 705/9 |
| 2005/0137925 | A1* | 6/2005 | Lakritz et al. .................. | 705/8 |
| 2006/0239440 | A1 | 10/2006 | Shaffer et al. | |
| 2007/0050228 | A1* | 3/2007 | Beshears ....................... | 705/9 |
| 2007/0127690 | A1 | 6/2007 | Patakula et al. | |

OTHER PUBLICATIONS

"Customer Spotlight: Navistar International," Web pae, unverified print date of Apr. 1, 2002.

"DKSystems Integrates QM Perception with OnTrack for Training," Web page, unvereified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterouseCoopers Case Study" the Business Challenge, Web page, unverified cover date of 2000.

Abstract, net.working: "An Online Webliography," *Technical Training* pp. 4-5 (Nov.-Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* pp. 8-11 (May/Jun. 1998).

Beck et al., "Applications of A1 in Education," *AMC Crossroads* vol. 1: 1-13 (Fall 1996) Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," Communications ACM 45(5): 62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of 06/10/96.

Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date of Apr. 12, 2002, unverified cover date of 1995.

Calvi and DeBra, "Improving the Usability of Hypertext Courseware through Adaptive Linking," *ACM*, unknown page numbers (1997).

Coffey, "Are Performance Objectives Really Necessary?" *Technical-Skills and Training* pp. 25-27 (Oct. 1995).

Cohen, "Knowledge Management's Killer App," pp. 1-11, Web page, unverified print date of Sep. 12, 2002, unverified cover date of 2001.

Cole-Gomolski, "New Ways to manage E-Classes," *Computerworld* 32(48):4344 (Nov. 30, 1998).

Cross: "Sun Microsystems—the SunTAN Story," Internet Time Group 8 ( © 2001).

Cybulski and Linden, "Teaching Systems Analysis and Design Using Multimedia and Patterns," unknown date, unknown source.

De Bra et al., "Adaptive Hypermedia: From Systems to Framework," *ACM* (2000).

De Bra, "Adaptive Educational Hypermedia on the Web," *Communications ACM* 45(5):60-61 (May 2002).

Dennis and Gruner, "Computer Managed Instruction at Arthur Andersen & Company: A Status Report," *Educational Technical* pp. 7-16 (Mar. 1992).

Diessel et al., "Individualized Course Generation: A Marriage Between CAL and ICAL," *Computers Educational* 22(1/2) 57-65 (1994).

Dyreson, "An Experiment in Class Management Using the World-Wide Web," pp. 1-12, Web page, unverified print date of Apr. 12, 2002.

E Learning Community, "Excellence in Practice Award: Electronic Learning Technologies," *Personal Learning Network* pp. 1-11, Web page, unverified print date of Apr. 12, 2002.

Eklund and Brusilovsky, "The Value of Adaptivity in Hypermedia Learning Environments: A Short Review of Empirical Evidence," pp. 1-8, Web page, unverified print date of May 2, 2002.

*e-Learning the future of learning*, THINQ Limited, London, Version 1.0 (2000).

Eline, "A Trainer's Guide to Skill Building," *Technical Training* pp. 34-41 (Sep./Oct. 1998).

Eline, "Case Study: Briding the Gap in Canada's IT Skills," *Technical Skills and Training* pp. 23-25 (Jul. 1997).

Eline "Case Study: IBT's Place in the Sun," *Technical Training* pp. 12-17 (Aug./Sep. 1997).

Fritz, "CB templates for productivity: Authoring system templates for trainers," *Emedia Professional* 10(8):6678 (Aug. 1997).

Fritz, "ToolBook II: Asymetrix's updated authoring software tackles the Web," *Emedia Professional* 10(20): 102106 (Feb. 1997).

Gibson et al., "A Comparative Analysis of Web-Based Testing and Evaluation Systems," pp. 1-8, Web page, unverified print date of Apr. 11, 2002.

Halberg and DeFiore, "Curving Toward Performance: Following a Hierarchy of Steps Toward a Performance Orientation," *Technical Skills and Training* pp. 9-11 (Jan. 1997).

Harsha, "Online Training 'Sprints' Ahead," *Technical Training* pp. 27-29 (Jan./Feb. 1999).

Heideman, "Training Technicians for a High-Tech Future: These six steps can help develop technician training for high-tech work," pp. 11-14 (Feb./Mar. 1995).

Heideman, "Writing Performance Objectives Simple as A-B-C (and D)," *Technical Skills and Training* pp. 5-7 (May/Jun. 1996).

Hollman, "Train Without Pain: The Benefits of Computer-Based Training Tools," pp. 1-11, Web page, unverified print date of Mar. 20, 2002, unverified cover date of Jan. 1, 2000.

Klein, "Command Decision Training Support Technology," Web page, unverified print date of Apr. 12, 2002.

Koonce, "Where Technology and Training Meet," *Technical Training* pp. 10-15 (Nov./Dec. 1998).

Kursh, "Going the distance with Web-based training," *Training and Development* 52(3): 5053 (Mar. 1998).

Larson, "Enhancing Performance Through Customized Online Learning Support," *Technical Skills and Training* pp. 25- 27 (May/Jun. 1997).

Linton, et al. "OWL: A Recommender System for Organization-Wide Learning," *Educational Technical Society* 3(1): 62-76 (2000).

Lucadamo and Cheney, "Best Practices in Technical Training," *Technical Training* pp. 21-26 (Oct. 1997).

McNamara, "Monitoring Solutions: Quality Must be Seen and Heard," *Inbound/Outbound* pp. 66-67 (Dec. 1989).

Merrill, "The New Component Design Theory: Instruction design for courseware authoring," *Instructional Science* 16:19-34 (1987).

Minton-Eversole, "IBT Training Truths Behind the Hype," *Technical Skills and Training* pp. 15-19 (Jan. 1997).

Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs,*" *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web-Based Courses," Web page, unverified print date of Mar. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available on high-vol. users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *infoWorld* 20(47):6467 (Nov. 23, 1998).
Unknown Author, "Long-distance learning," *infoWorld* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business".
Witness Systems promotional brochure for eQuality entitled "Building Customer Loyalty Through Business-Driven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.
Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst. *It's Baa-aack. How Interative TV is Sneaking Into Your Living Room*, The AnchorDesk, May 10, 1999.
Berst. *Why Interactive TV Won't Turn You On (Yet)*, The AnchorDesk, Jul. 13, 1999.
Borland and Davis. *US West Plans Web Services on TV*, CNETNews.com, Nov. 22, 1999.
Brown. *Let PC Technology Be Your TV Guide*, PC Magazine, Jun. 7, 1999.
Brown. *Interactive TV: The Sequel*, NewMedia, Feb. 10, 1998.
Cline. *Déjà vu—Will Interactive TV Make It This Time Around?*, DevHead, Jul. 9, 1999.
Crouch. *TV Channels on the Web*, PC World, Sep. 15, 1999.
D'Amico. *Interactive TV Gets $99 set-top box*, IDG.net, Oct. 6, 1999.
Press. *Two Cultures, The Internet and Interactive TV*, Universite de Montreal.
Reuters. *Will TV Take Over Your PC?*, PC World Online.
Rohde. *Gates Touts Interactive TV*, InfoWorld, Oct. 14, 1999.
Ross. *Broadcasters Use TV Signals to Send Data*, PC World Oct. 1996.
Schlisserman. *Is Web TV a Lethal Weapon?*, PC World Online.
Stewart. *Interactive Television at Home: Television Meets the Internet*, Aug. 1998.
Swedlow. *Computer TV Shows: Ready for Prime Time?*, PC World Online.
Wilson. *U.S. West Revisits Interactive TV*, Interactive Week, Nov. 28, 1999.
Wittwer, John, "How to Create a Timeline in Excel", retrieved from URL: http://www.vertex42.com/ExcelArticles/create-a-timeline.html on Feb. 9, 2005.
Wallace, Rodney B. et al., "A Staffing Algorithm for Call Centers with Skill-Based Routing", Manufacturing Service Operations management, Fall 2005, vol. 7, No. 4: 276-294, 1526-5498 electronic ISSN.
Iex, "Total View WebStation Guide" Published Jun. 2004, Document No. 1-602-660, Release 3.7, 310 pages.
Klungle, Roger, "Simulation of a Claims Call Center: A Success and a Failure", Proceedings of the 1999 Winter Simulation Conference, vol. 2, pp. 1648-1653, Dec. 5-8, 1999, ISBN: 0-7803-5780-9.
Communitywfm.com Symon's "Community" software website, Aug. 2003, downloaded from web.archive.org on Apr. 15, 2009.
Gans, Noah et al., "Telephone Call Centers: Tutorial, Review, and Research Prospects", Manufacturing Service Operations Management, Spring 2003, vol. 5: 79-141, 1526-5498 electronic ISSN.
Jim Quiggins, et al., "A New Approach to Contact Center Optimization", IEX Corporation, Jun. 21, 2004, 11 pages.
Ger Koole, et al., "Queuing Models of Call Centers: An Introduction", Annals of Operations Research, vol. 113, pp. 41-59, Jul. 2002, ISSN 0254-5330 (Print) 1572-9338 (Online), 18 pages.
Davis. *Satellite Systems Gear Up for Interactive TV Fight*, CNETNews.com, Sep. 30, 1999.
Diederich. *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger. *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle. *Will The Net Kill Network TV?* PC World Online, Mar. 10, 1999.
Kane. *AOL-Tivo: You've Got Interactive TV*, ZDNN, Aug. 17, 1999.
Kay. *E-Mail in Your Kitchen*, PC World Online, 093/28/96.
Kenny. *TV Meets Internet*, PC World Online, Mar. 28, 1996.
Linderholm. *Avatar Debuts Home Theater PC*, PC World Online, Dec. 1, 1999.
Mendoza. *Order Pizza WhileYyou Watch*, ABCNews.com.
Moody. *WebTV: What the Big Deal?*, ABCNews.com.
Murdorf, et al. *Interactive Television—Is There Life After the Internet?*, Interactive TV News.
Needle. *PC, TV or Both?*, PC World Online.
*Interview with Steve Perlman*, CEO of Web-TV Networks, PC World Online.

\* cited by examiner

FIG. 1

| VTO Template 2200 | |
|---|---|
| Activity: | TimeOff |
| Duration | |
| Action | Truncate |
| Placement: | BeginningOfShift/ EndOfShift/ Either |

FIG. 3B

| OT Template 2200 | |
|---|---|
| Activity: | Phone/ Email/ Fax |
| Duration | |
| Action | Extend |
| Placement: | BeginningOfShift/ EndOfShift/ Either |
| Gap | |

SHIFT 520A "JOHN M 9-5"

| 730A<br>VTOB 9-10 | 730B<br>VTOB NONE |
|---|---|
| 750B<br>VTOE NONE | 750A<br>VTOE 4-5 |

| 710B<br>OTB 7-8 | 710A<br>OTB 8-9 |
|---|---|
| 710C<br>OTB 7-9 | 710D<br>OTB NONE |

SHIFT 520B "JOHN T 10-6"

| 740A<br>VTOB 10-11 | 740B<br>VTOB NONE |
|---|---|
| 760B<br>VTOE NONE | 760A<br>VTOE 5-6 |

| 720B<br>OTB 8-9 | 720A<br>OTB 9-10 |
|---|---|
| 720C<br>OTB 8-10 | 720D<br>OTB NONE |

SHIFT 520C "FRED W 11-7"

| 770D<br>VTOE NONE | 770B<br>VTOE 5-6 | 770A<br>VTOE 6-7 |
|---|---|---|
| | 770C<br>VTOE 5-7 | |

---

SCHED. OBJ 540A
JOHN M9-5
EXTEND (OT)
BEFORE
2 HOURS
NO GAP
—
SCHED. OBJ 540B
JOHN T10-6
EXTEND (OT)
BEFORE
2 HOURS
NO GAP

SCHED OBJ 550C
JOHN M9-5
TRUNCATE (VTO)
BEGINNING
1 HOUR
NO GAP
—
SCHED OBJ 550D
JOHN T10-6
TRUNCATE (VTO)
BEGINNING
1 HOUR
NO GAP

SCHED OBJ 540E
JOHN M9-5
TRUNCATE (VTO)
END
2 HOURS
NO GAP
—
SCHED OBJ 540F
JOHN T10-6
TRUNCATE (VTO)
END
2 HOURS
NO GAP

SCHED OBJ 540G
FRED T11-7
TRUNCATE (VTO)
END
2 HOURS
NO GAP

SYSTEMS AND METHODS FOR AUTOMATIC SCHEDULING OF A WORKFORCE

FIELD OF THE DISCLOSURE

The present disclosure relates to contact centers, and more specifically, to automatic scheduling of a workforce.

BACKGROUND

A manager in a contact center (also known as a call center) typically uses workforce scheduling software to create a schedule which assigns workers (agents) to shifts throughout the workday. The scheduler chooses an optimal schedule that meets constraints while optimizing goals. Inputs such as predicted workload (e.g., call volume in 15-minute intervals, average call duration) and work rules (e.g., maximum shift length, possible shift start time, break requirements) are treated as constraints. Inputs such as expected level of service (e.g., call hold time) are treated as goals. The scheduler generates many possible schedules, and examines the possibilities to find a schedule that optimizes goals while remaining within the constraint boundaries.

In general, existing workforce schedulers accurately schedule an appropriate number of agents to handle the expected workload during each time interval. It is common, however, for workload and/or agent availability to vary from predicted values once a workday has begun. To keep the contact center running at peak performance, the schedule should then be adjusted, by giving some agents overtime or giving some agents time off. Existing schedulers do not support automatically scheduling of overtime or time-off after a schedule has been created and the day has started. Therefore, a contact center manager typically responds by manually creating overtime or time-off events, through which a particular shift for a particular agent is extended or truncated. The process by which a manager manually determines which agents should be assigned overtime or time-off, and where the overtime or time-off should be placed on a schedule, can be time-consuming, tedious, and difficult.

SUMMARY OF THE INVENTION

Systems and methods are disclosed for scheduling a workforce. In one embodiment, the method comprises: receiving a workforce schedule including assignments of workers to shifts; receiving a template describing alterations to shifts; and applying schedulable objects to the workforce schedule in accordance with a workload forecast and schedule constraints. In one embodiment, the system comprises: a user interface and a scheduler. The user interface allows creation of shift alteration templates and associating templates with workers. The scheduler uses the shift alteration templates to modify an existing schedule of assignments of workers to shifts.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
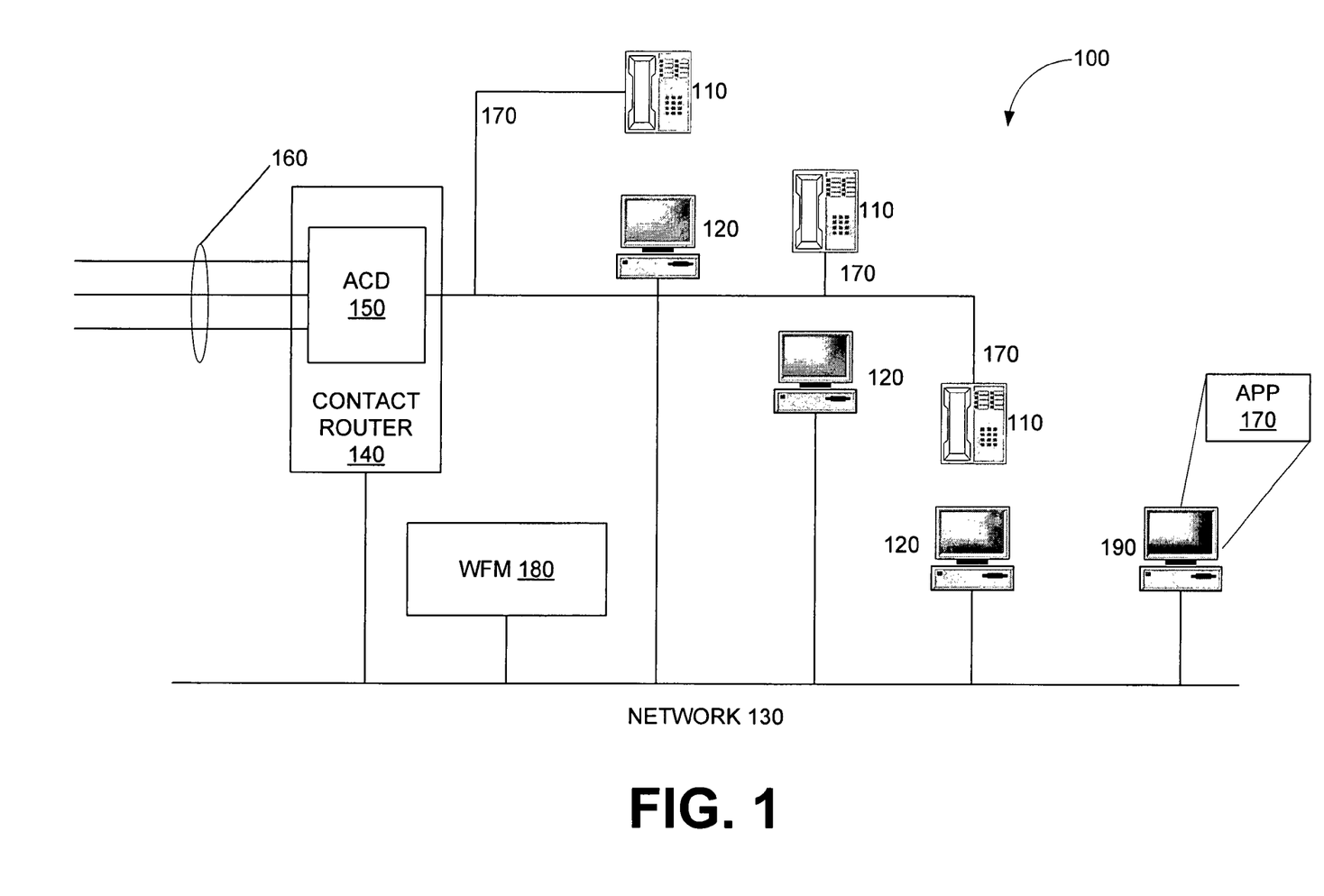
FIG. 1 is a block diagram of a representative contact center environment, in which an embodiment of a system and/or method for automatic scheduling of a workforce can be implemented.

FIG. 1 is a block diagram of a contact center environment 100. contact center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 150 to route phone contacts. The embodiments described herein will refer to ACD 150 instead of contact router 140, but analogous contact router actions and operations are intended to be captured by this disclosure. Note that a predictive dialer (not shown) could be used for directing outbound calls to agents for handling.

If an agent is not available to handle a particular call, ACD 150 puts the call into a queue, which effectively places the caller on hold. When an agent is available, ACD 150 connects the outside trunk line 160 carrying the phone call to one of the agents. More specifically, ACD 150 connects the outside trunk line 160 to the trunk line 170 of the selected agent.

When an agent is ready to handle contacts, the agent first logs into ACD 150. This login notifies ACD 150 that the agent is available to take calls. An agent's ACD state changes throughout the workday, as the agent performs work activities such as handling calls, performing after-call work, and taking breaks. An example list of states includes available, busy, after-call work, and unavailable.

While handling a contact, the agent interacts with one or more applications running on workstation 120. By way of example, workstation applications could provide the agent with access to customer records, product information, ordering status, and transaction history. The applications may access one or more business databases (not shown) via the network 130.

Call center 100 also includes a work force management system (WFMS) 180. WFMS 180 performs many functions. One such function is providing a contact center supervisor or manager with information about agents and contacts, both historical and real-time. Another function is supplying the supervisor with information on how well each agent complies with contact center policies. Yet another function is calculating staffing levels and creating agent schedules based on historical patterns of incoming contacts. The functionality of the entire work force management system (WFMS) 180 is typically divided among several applications, some of which have a user interface component, and WFMS 180 comprises the suite of applications.

In the environment described above, the workers assigned to shifts are contact center agents. However, the scheduling methods and systems described herein are also applicable to scheduling other kinds of workers in other types of work environments. Therefore, the remaining embodiments will refer to workers rather than agents.

Figure 2:
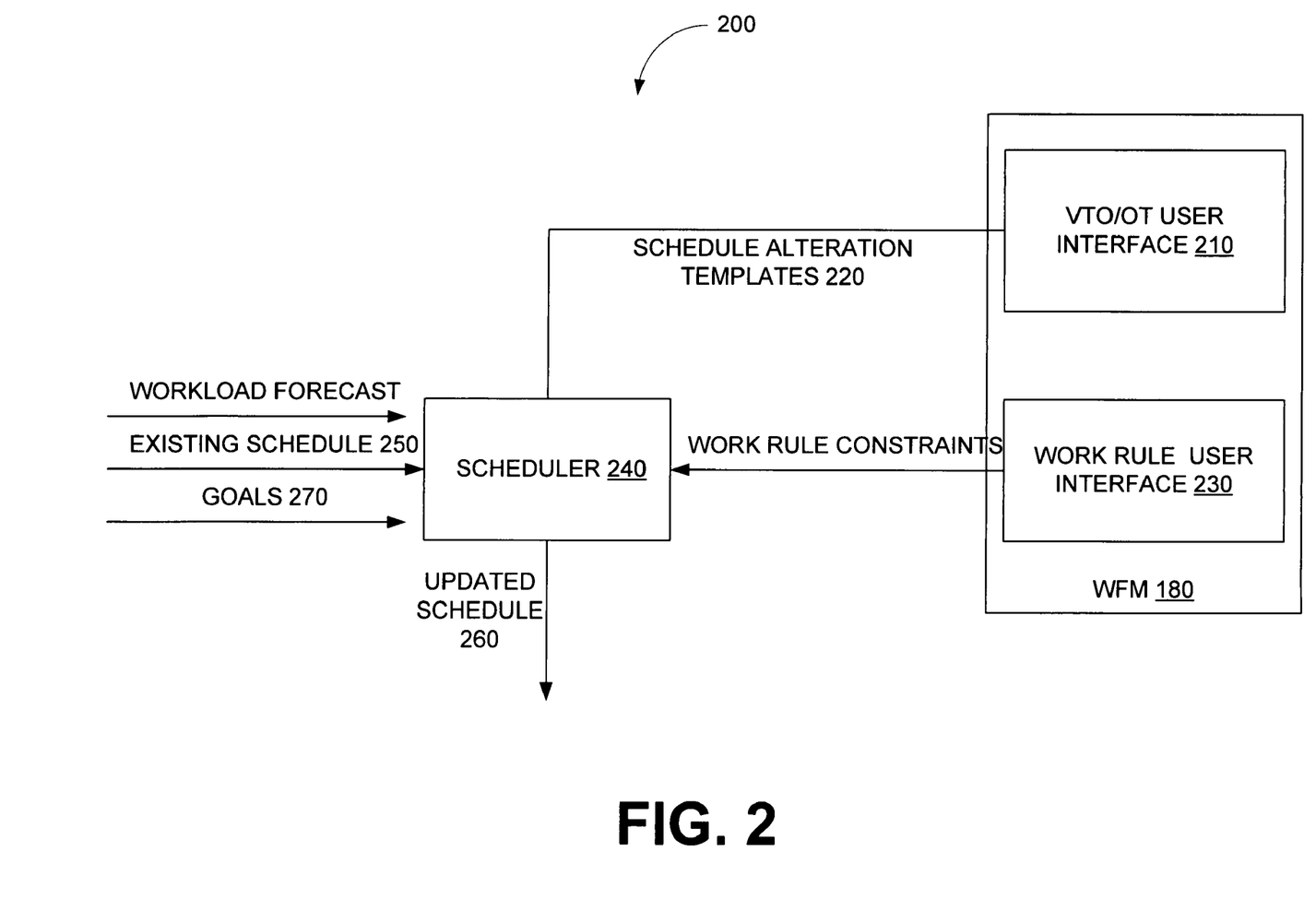
FIG. 2 is a dataflow diagram showing one embodiment of a system for automatic scheduling of a workforce.

FIG. 2 is a dataflow diagram showing one embodiment of a system (200) for automatic scheduling of a workforce. A user interacts with a template user interface component 210 of WFMS 180 to define one or more schedule alteration templates 220. These schedule alteration templates 220 define ways in which a schedule can be altered. A user also interacts with a work-rule user interface component 230 to define work rules such as maximum shift length, shift start times, and break requirements. Although shown as two separate components in FIG. 2, in another embodiment the template user interface 210 and work-rule interface 230 are combined into a single user interface.

Two different types of templates can be created in the embodiment in FIG. 2. Voluntary time-off (VTO) templates 220V describe an alteration that truncates an already-scheduled shift and adds a new time-off activity located adjacent to that shift. Overtime (OT) templates 220O describe an alteration that extends an already-scheduled shift to include a new work activity, where the extension may allow a gap between the original shift and the overtime.

Schedule alteration templates 220 are provided as input to a scheduler component 240, along with an existing schedule 250. Scheduler 260 produces an updated schedule 270 that attempts to optimize goals 280 while meeting a workload forecast 290 and a set of work-rule constraints 2100.

Figure 3A:
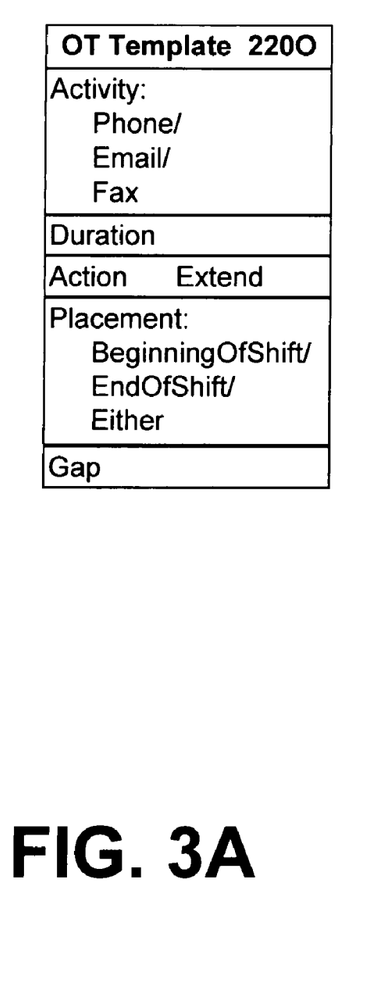
FIG. 3A is a block diagram showing one representation of an overtime (OT) template from FIG. 2.

FIG. 3A is a block diagram showing one representation of an overtime (OT) template 2200. An OT template 2200 is one type of schedule alteration template 220, through which a user defines ways in which a workday shift can be altered. OT template 2200 includes the following attributes: an activity 310; a duration 320; an action 330; a placement 340; and a gap 350. Activity 310 represents the expected work activity to be performed during the overtime. Typical examples include phone, email, and fax, but this field can be any work activity. Duration 320 represents the duration of the overtime shift. In one embodiment, duration 320 is a range, indicating a minimum and a maximum value for the duration. For overtime, action 330 is set to Extend, since overtime extends an existing shift. Placement 340 refers to where the overtime is placed on the schedule relative to the existing shift: BeginnningOfShift, EndOfShift, or Either. Finally, gap 350 allows time between the existing shift and the overtime. A special value, such as zero, indicates that the overtime occurs next to the existing shift, with no gap. In one embodiment, gap 350 is a range, indicating a minimum and a maximum value for the gap.

Figure 3B:
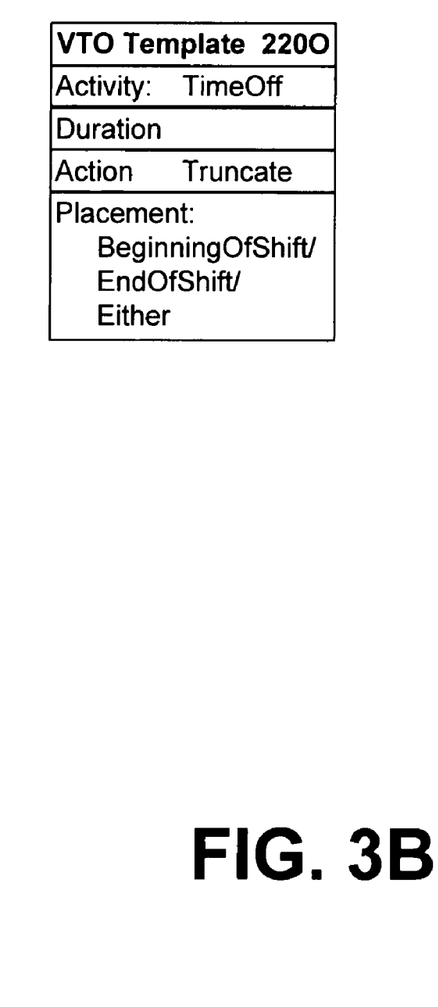
FIG. 3B is a block diagram showing one representation of a voluntary time-off (VTO) template from FIG. 2.

FIG. 3B is a block diagram showing one representation of a voluntary time-off (VTO) template 220V. VTO template 220V is another type of schedule alteration template 220, through which a user defines ways in which a workday shift can be altered. VTO template 220V includes an activity 360; a duration 370; an action 380; and a placement 390. Activity 360 is set to VoluntaryTimeOff since the worker is not performing a work activity. Duration 370 represents the duration of the time off. In one embodiment, duration 370 is a range, indicating a minimum and a maximum value for the duration. Action 380 is set to Truncate, since time-off truncates an existing shift. Placement 390 refers to where the time-off activity is placed relative to the existing shift: BeginnningOfShift, EndOfShift, or Either.

Figure 4:
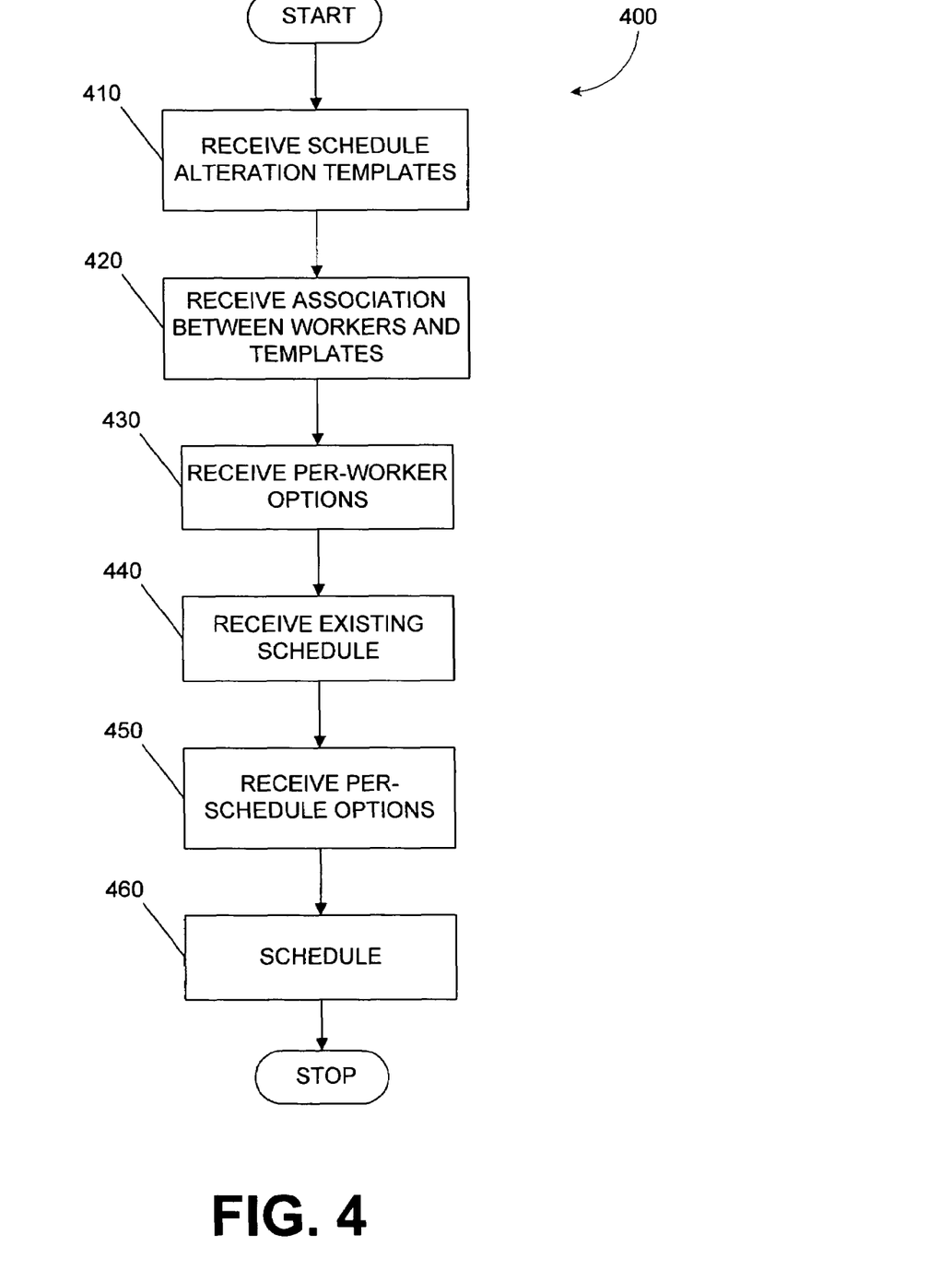
FIG. 4 is a flowchart for one embodiment of a method for automatic scheduling of a workforce.

FIG. 4 is a flowchart for one embodiment of a method (400) for automatic scheduling of a workforce. At block 410, one or more schedule alteration templates (220) are received. Next (block 420), an association between workers and templates 220 is received. At block 430, worker-specific VTO/OT scheduling options are received. In one embodiment, these worker-specific scheduling options include: maximum OT/VTO per day and/or per week; OT Before/After Shift preferences (e.g., Prefer, Don't Want, Any); and VTO Start Of/End Of Shift preferences (e.g. Prefer, Don't Want, Any). Block 430 is optional, but if present is repeated for each worker that is associated with a schedule alteration template 220.

Processing then continues at block 440, where a selection of an existing schedule 250 is received. Next (block 450), options specific to the selected schedule are received. In one embodiment, these schedule-specific options include: maximum OT/VTO per day and/or per week; Add OT Placement (Before/After shift); and Add VTO Placement (Start Of/End Of shift). Block 450 is optional. At block 460, an updated schedule 270 is produced based on the received templates 220 and options (if present). Updated schedule 270 is produced in accordance with constraints 2100 and goals 280. As will be described in further detail in connection with FIGS. 5, 6, and 7A-D, updated schedule 270 is calculated by generating schedulable objects (FIG. 5) and then applying the objects to existing schedule 250.

Figure 5:
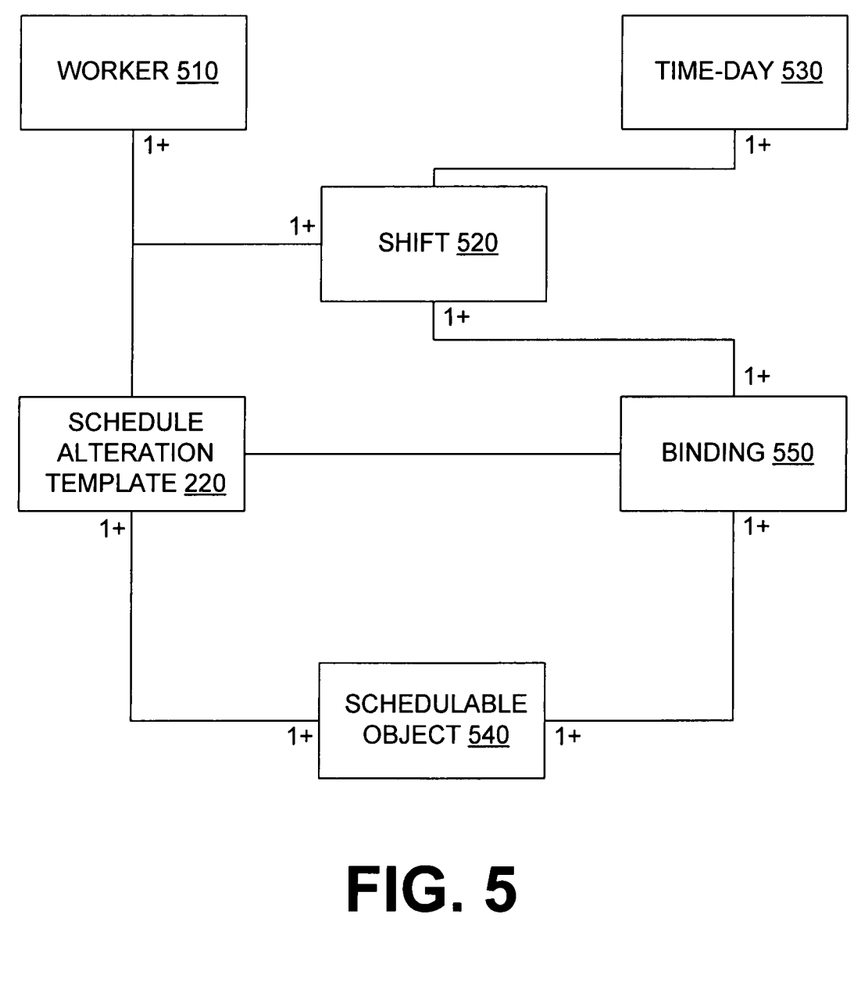
FIG. 5 shows a set of entities, and the interrelationships between them, used by one embodiment of a scheduler that includes automatic scheduling of a workforce.

FIG. 5 shows a set of entities, and the interrelationships between them, used by one embodiment of a scheduler 260 that supports automatic scheduling of a workforce. Schedule alteration templates 220 were discussed earlier in connection with FIG. 3. As stated earlier, each schedule alteration template 220 is associated with one or more workers 510. Each worker 510 is also associated with a shift 520, where a shift 520 is described by a time range and a day (530). As can be seen in FIG. 5, worker 510 can have more than one shift 520, and a time range-day 530 can be associated with more than one shift 520 (e.g., different workers). However, a particular shift 520 is specific to worker and to a time range-day (e.g. a shift representing "John Doe on Monday 9 AM-5 PM.").

A schedule alteration template 220 describes possible alterations to any already-scheduled shift 520, but is not associated with any particular shift 520. Scheduler 260 creates one or more schedulable objects 540 based on each schedule alteration template 220, such that attributes in a schedulable object 540 are initialized from corresponding attributes in the template 220. Each schedulable object 540 is associated with a shift 520, and represents a possible change in the schedule adjacent to that shift 520.

Scheduler 260 also creates a set, or domain, of bindings 550 for each shift 520. A binding represents a time slot in, or adjacent to, an employee shift. As can be seen in FIG. 5, a schedulable object 540 can possibly be bound to more than one binding 550. Scheduler 260 chooses one optimal binding 550 for each schedulable object 540. By selecting a binding for a schedulable object, scheduler 260, in effect, assigns the work activity for that one object (derived from a template) to the time slot specified in the binding. The process of creating schedulable objects 540, creating bindings 550, and choosing optimal bindings 550 will now be discussed in connection with FIGS. 6 and 7.

Figure 6:
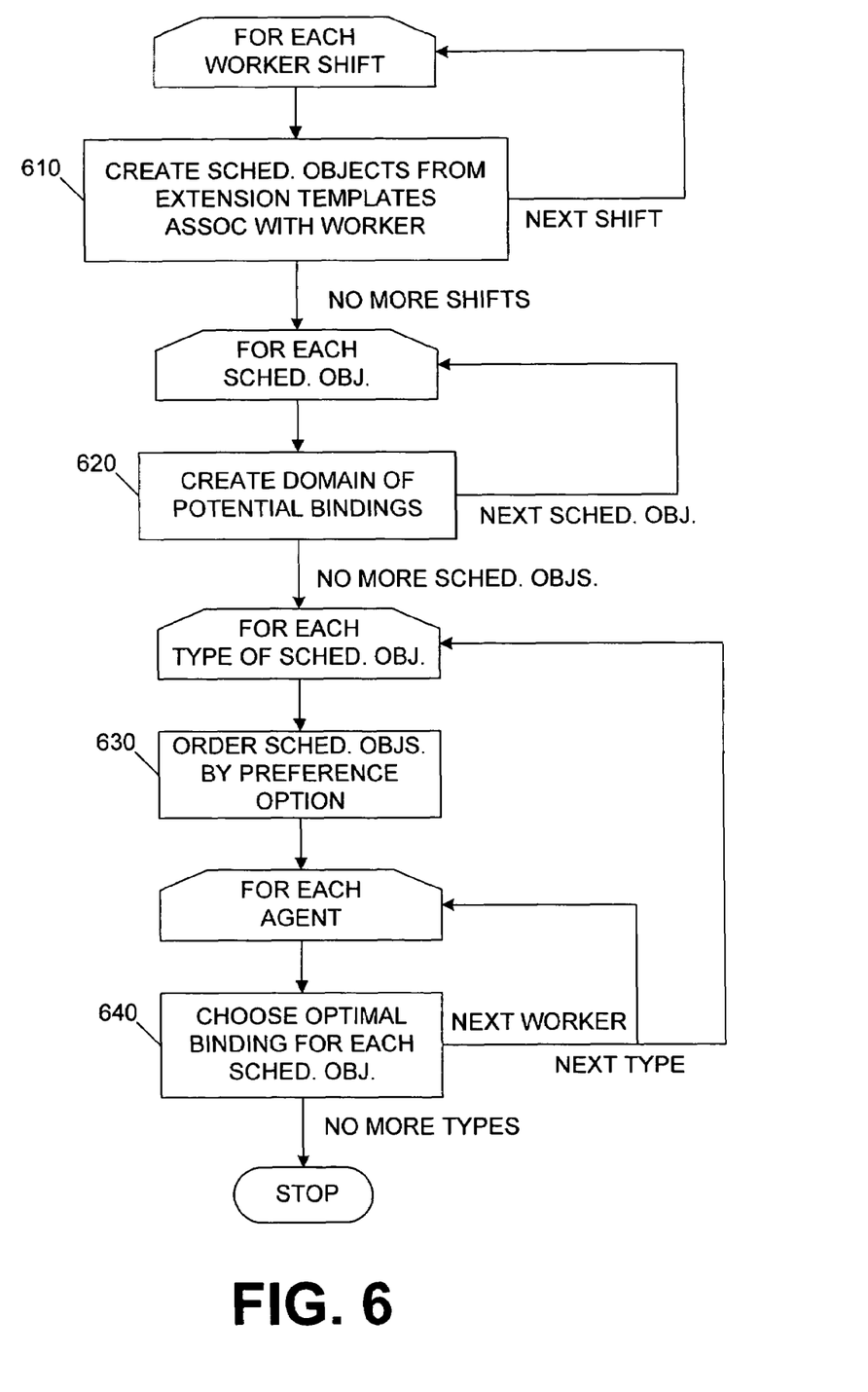
FIG. 6 is a flowchart for one embodiment of a scheduler that includes automatic scheduling of a workforce.

FIG. 6 is a flowchart for one embodiment of scheduler 260 that supports automatic scheduling of a workforce. At block 610, schedulable objects are created from schedule alteration templates 220. The creation of schedulable objects from schedule alteration templates 220 and an existing schedule 250 can be seen in the example scenario illustrated in FIG. 7. In this example scenario, existing schedule 250 is composed of multiple worker shifts 520: John's Monday shift from 9 AM to 5 PM (shift 520A); John's Tuesday shift from 10 AM to 6 PM (shift 520B); and Fred's Tuesday shift from 11 AM to 7 PM (shift 520C). John is associated with three schedule alteration templates 220: overtime before (template 220OB); voluntary time-off before (template 220VB); and voluntary time-off after (template 220VA). Fred is associated with the two "after" templates, template 220OA and template 220VA.

For templates 220 with a placement value of either "BeginningOfShift" or "EndOfShift", scheduler 260 creates a set of schedulable objects 540 associated with those templates. (As the name suggests, these values specify where the object is scheduled in relation to the shift; see the discussion of FIG. 3 for more discussion of these placement values.) Specifically, one object 540 is created for each worker shift associated with the template 220. In the example scenario of FIG. 7, template 220OB is associated with two shifts (John M9-5 and John T10-6), so two objects (540A and 540B) are created from template 220OB. In this example, the template-shift association is indirect, through a template-worker relationship and a worker-shift relationship; however, another embodiment using a direct association between template and shift is contemplated. One of ordinary skill in the art should understand by viewing FIG. 7 how the remaining objects 540C-G are created from the other two templates in a similar manner.

If the template 220 has a placement value of "Either", then the above process is repeated to create two such sets of objects. One of the sets gets a placement value of "BeginningOfShift" and the other corresponding set gets a placement value of "EndOfShift". In the simple example scenario of FIG. 7, none of the three templates (220OB, 220VB, 220VA) has a placement value of "Either".

Returning to the flowchart in FIG. 6, after schedulable objects are created in block 610, processing continues at block 620, where a set, or domain, of potential bindings is created for schedulable objects 540, based on attributes such as start time, end time, gap, and duration. Values for these schedulable object attributes are derived from corresponding attributes in template 220. Creation of bindings 550 will now be discussed in connection with FIG. 7.

A schedulable object 540 is associated with a worker shift 520, which has a start time and an end time. Bindings 550 also have a start time and an end time. Bindings 550 are created for a particular shift 520, starting with the time slot adjacent to the shift start or end (depending on whether the Action attribute in object 540 is "Beginning" or "End"). The number of bindings 550 depends on the Duration attribute in the object 540: enough bindings are created to span the time specified by the Duration attribute. However, these bindings 550 are also constrained by work-rules, which may limit the start or end time of a shift (e.g., a particular shift cannot starts before 6 AM or end after 9 PM).

In the example of FIG. 7, the object 540A ("John M9-5 OT Before") has a Duration of 2 hours, and is associated with shift 520M. Therefore, three bindings 710 are created: 710A is a one-hour slot from 8-9 AM; 710B is a one-hour slot from 7-8 AM; and 710C is a single two-hour slot from 7-9 AM. In addition, a "no time" binding is created (710D), representing the possibility that no object will be scheduled in this slot. The time slot granularity chosen in FIG. 7 is merely an example, and the time slot granularity of the bindings can be a larger or a smaller value.

Viewing FIG. 7, one of ordinary skill in the art should understand how bindings for remaining objects 540B-G are created in a similar manner: binding 720A-D for object 540B ("John T10-6 OT Begin"); binding 730A-B for object 540C ("John M9-5 VTO Begin"); binding 740A-B for object 540D ("John T10-6 VTO Begin"); binding 750A-B for object 540E ("John M9-5 VTO End"); binding 760A-B for object 540F ("John T10-6 VTO End"); and binding 770A-D for object 540G ("Fred T 11-7 VTO End").

In this example, the domain of bindings for a schedulable object includes at least one binding with a time slot adjacent to the shift, because the Gap field in each object is zero. (The Gap field in a schedulable object is set from the template.) In contrast, the bindings created for objects that have a non-zero Gap field do not include a time slot adjacent to the shift. Instead, the closest time slot is separated from the shift by the value specified by Gap. In this example, the Gaps are fixed values, but in other embodiments Gap is a range, which results in the creation of additional bindings.

Returning to the flowchart in FIG. 6, after schedulable objects are created in block 610, processing continues at block 630, where OT objects are ordered according to worker-specific scheduling preferences. As described earlier in connection with FIG. 5, scheduler 260 receives OT and VTO preferences (e.g., Prefer, Don't Want, Any) set by workers. Thus, schedulable objects 540 associated with workers that prefer OT are first, and schedulable objects 540 associated with workers that do not want OT are last, with schedulable objects 540 associated with workers with no preference in the middle.

Next, at block 640, the optimal binding for each OT object is selected. The techniques that schedulers use to produce an optimal schedule for a given set of inputs (workload, constraints, and goals) should be understood by a person of ordinary skill in the art. Such techniques include, but are not limited to, local search, simulated annealing, and heuristics. The use of schedulable objects and bindings should also be understood by such a person.

Since the previous step 630 was ordered by worker, the effect is to choose bindings for all the OT objects of the same type (Begin or End) for one worker before moving to the next worker. When bindings for all objects have been chosen, the ordering and selection blocks 630 and 640 are repeated for VTO objects. This process can be extended to support schedulable objects of other types as well.

Figure 7A:
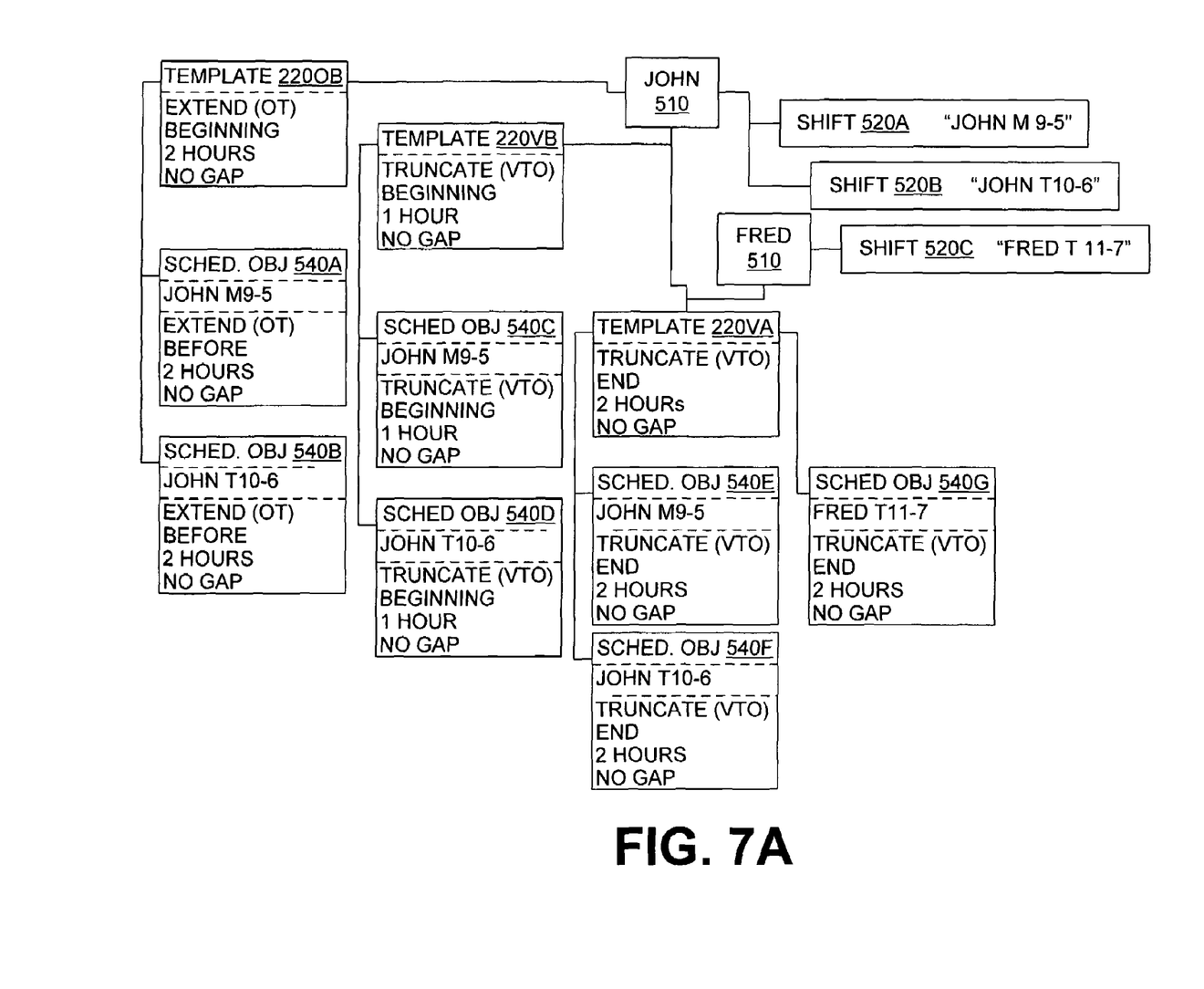
FIGS. 7A-7D illustrate an example scenario in which a scheduler automatically schedules overtime and time-off for a workforce.
Figure 7B:
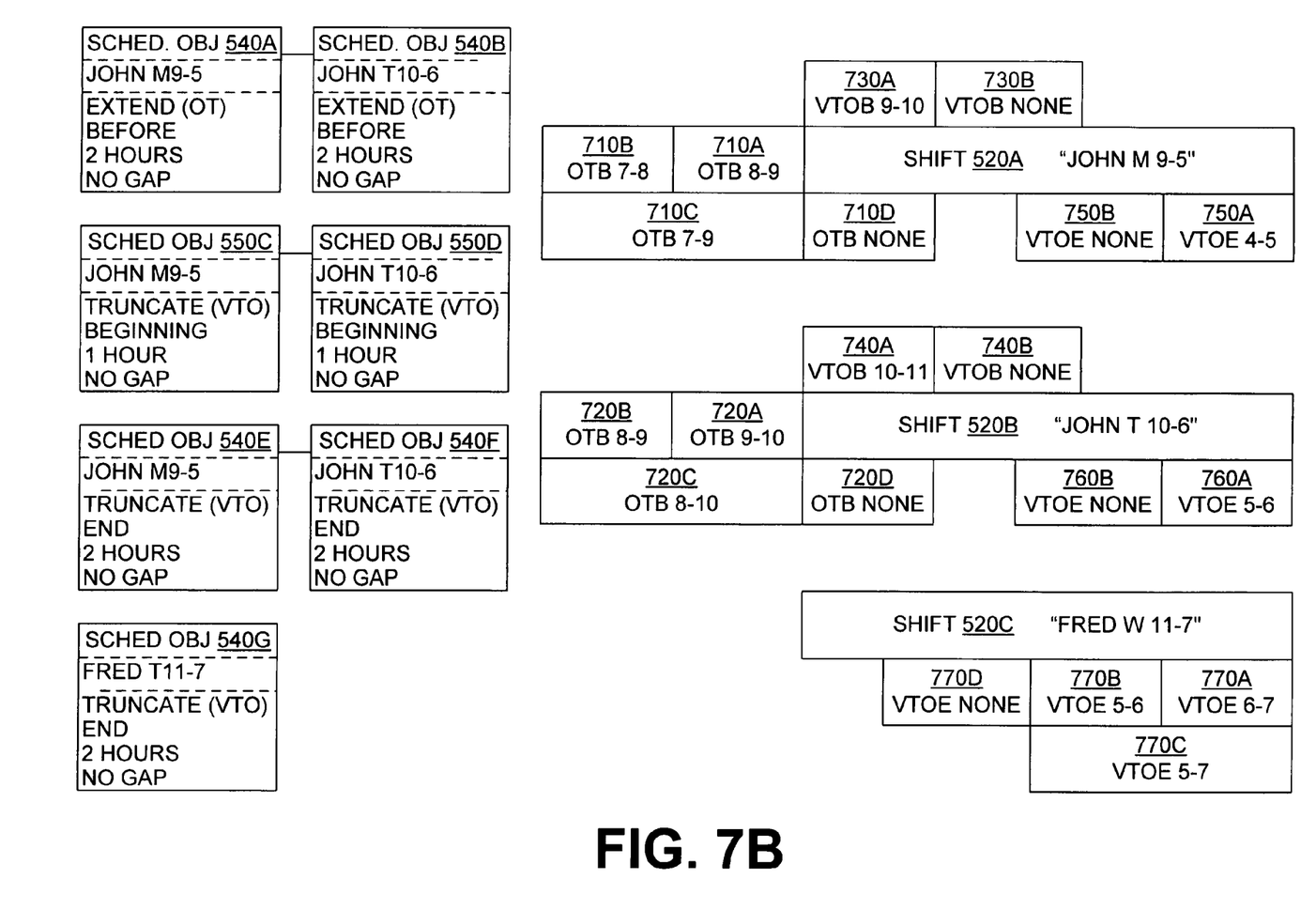
Figure 7C:
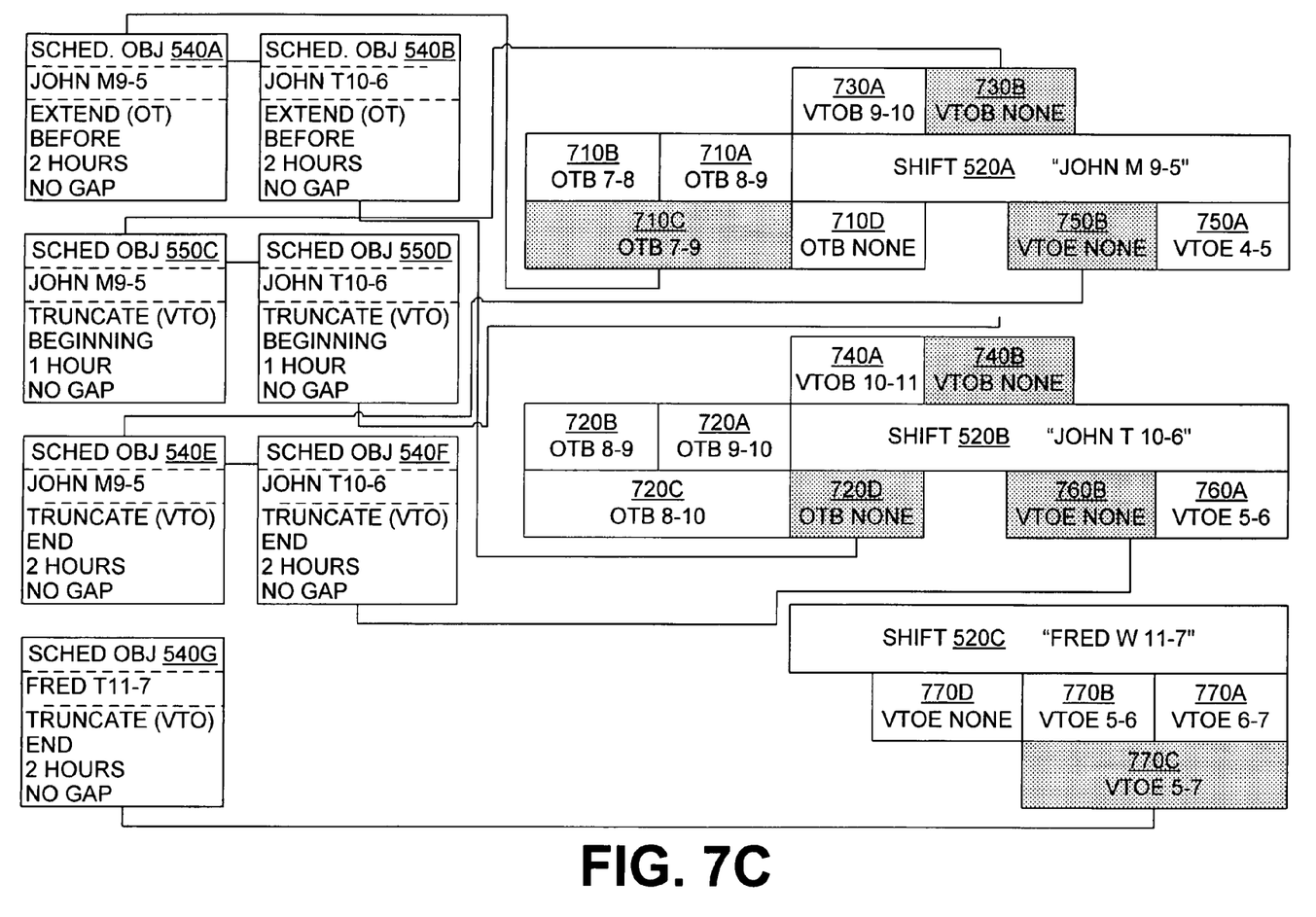

FIG. 7C shows the bindings chosen by the scheduler 260 for schedulable objects 540A-I, in one example scenario. In this diagram, bindings selected by scheduler 260 are shaded, while those not selected are not shaded. As can be seen in FIG. 7C, several objects are bound to a "none" slot: object 540B ("John T10-6 OT Begin"); object 540H ("John M9-5 VTO Begin"); object 540I ("John M9-5 VTO End"); object 540J ("John T10-6 VTO Begin"); and object 540K ("John T10-6 VTO End"). Object 540A ("John M9-5 OT Before") is bound to the two-hour slot representing 7-9 (710C). Object 540G ("Fred T11-7 VTO After") is bound to the two-hour slot representing 5-7 (770C).

Figure 7D:
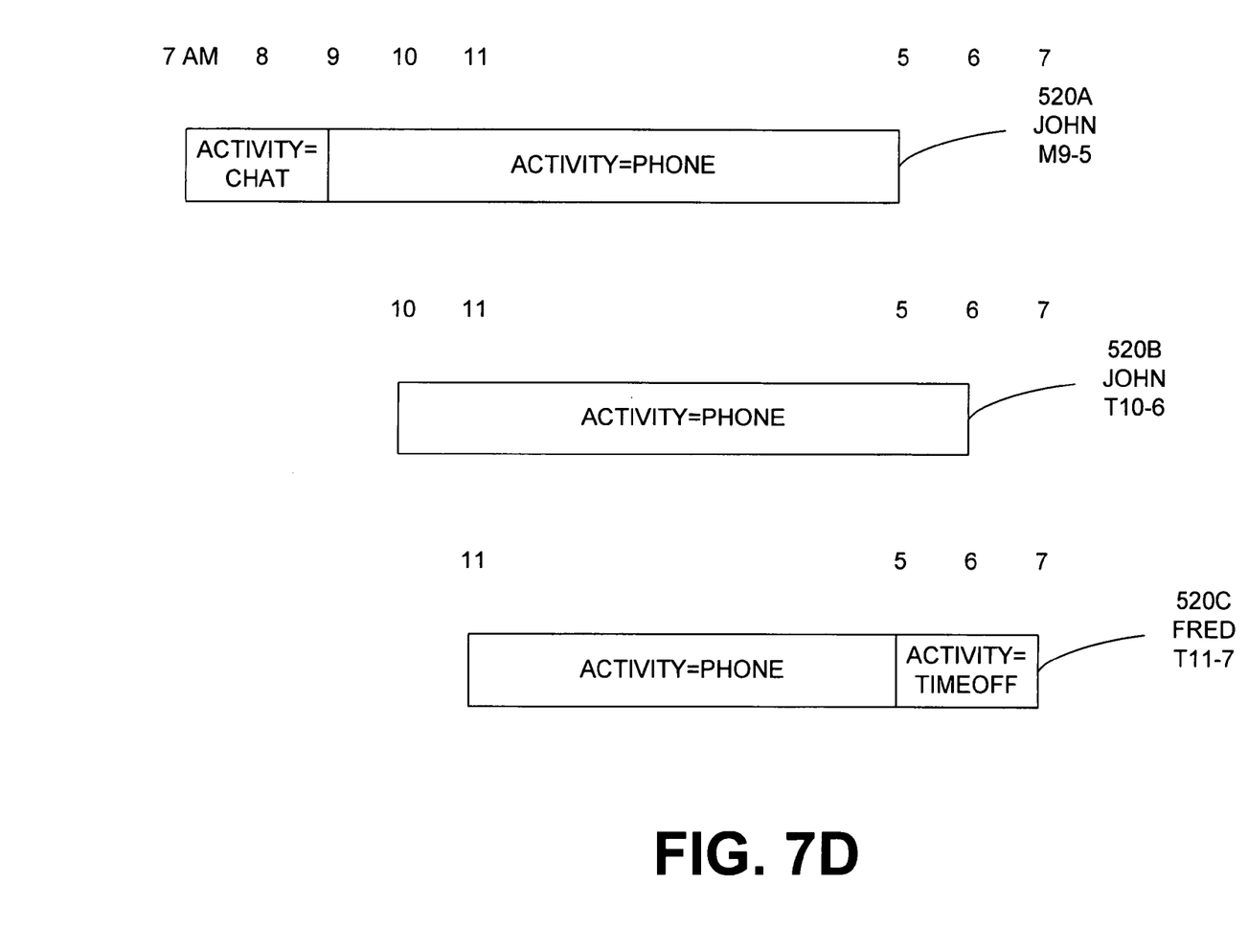

FIG. 7D shows an updated schedule 270 resulting from the selected bindings shown in FIG. 7C. Shift 520A ("John M 9-5") has been modified to include a new work activity from 7 AM to 9 AM. This is a result of the binding representing 7-9 AM (binding 710C) being selected for object 540A ("John M9-5 OT Before"). The bindings selected for the other objects for shift 520A (540L and 540M) were all "none", meaning schedulable objects 540N and 540O did not affect shift 520A. All bindings selected for shift 520B ("John T 10-6") object were "none", meaning shift 520B remains unchanged. Shift 520C ("Fred T11-7") has been modified to include a new time-off activity from 5 PM to 7 PM. This is a result of binding representing 5-7 PM (binding 770C) being selected for object 540G ("Fred T11-7 VTO After").

Figure 8:
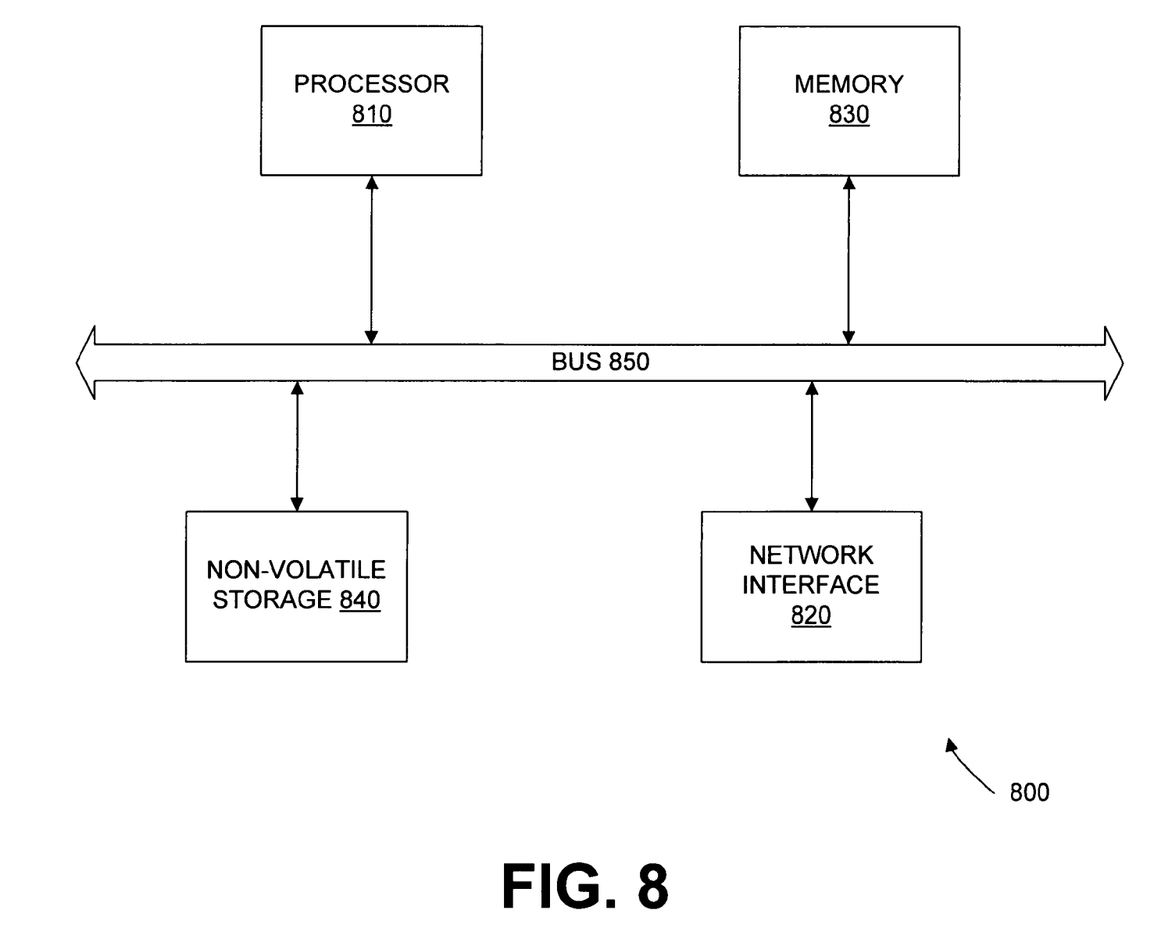
FIG. 8 is a hardware block diagram of a general-purpose computer which can be used to implement systems and methods for automatic scheduling of a workforce.

FIG. 8 is a hardware block diagram of a general-purpose computer 800 which can be used to implement various embodiments of systems and methods for automatic scheduling of a workforce. Computer 800 contains a number of components that are well known in the art of contact center software, including a processor 810, a network interface 820, memory 830, and non-volatile storage 840. Examples of non-volatile storage include, for example, a hard disk, flash RAM, flash ROM, and EEPROM. These components are coupled via a bus 850. Memory 830 contains instructions which, when executed by the processor 810, implement systems and methods for automatic scheduling of a workforce, such as the processes depicted in the diagrams of FIGS. 4, 5, 6, and 7A-D. Omitted from FIG. 8 are a number of conventional components that are unnecessary to explain the operation of computer 800.

The systems and methods for automatic scheduling of a workforce can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain or store the program for use by, or in connection with, the instruction execution system. The computer readable medium can be, for example but not limited to, a system that is based on electronic, magnetic, optical, electromagnetic, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology includes (but are not limited to): a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

We claim:

1. A method of workforce scheduling, comprising the steps of:
   in an instruction execution system, receiving a first workforce schedule describing existing assignments of a plurality of workers to a plurality of shifts, each of the shifts being associated with a time range and a day;
   in the instruction execution system, receiving a shift alteration template describing allowable alterations to shift time ranges;
   in the instruction execution system, receiving an association between the shift alteration template and at least one of the workers; and
   in the instruction execution system, producing a second workforce schedule that modifies the length of at least one of the plurality of shifts, by applying at least one schedulable object to the workforce schedule in accordance with a workload forecast and schedule constraints, wherein the at least one schedulable object is based on the shift alteration template.

2. The method of claim 1, further comprising the step of:
   receiving at least one schedule alteration option associated with one of the workers, the option describing a worker preference for overtime or time-off.

3. The method of claim 1, further comprising the step of:
   receiving at least one schedule alteration option associated with the workforce schedule, the option describing a preference for placement of overtime or time-off relative to a shift.

4. The method of claim 1, wherein the template includes a duration attribute and a placement attribute.

5. The method of claim 4, wherein the schedulable object is associated with a specific worker shift, and wherein the schedulable object includes a duration attribute and a placement attribute derived from the corresponding attribute in the template.

6. The method of claim 1, wherein the producing step further comprises the steps of:
   creating at least one schedulable object from the shift alteration template;
   creating a plurality of potential bindings for the at least one schedulable object based on the assignments in the schedule;
   selecting one of the potential bindings for association with the schedulable object, in accordance with the workload forecast and the schedule constraints; and
   producing the modified schedule by applying the selected one of the bindings to the schedulable object.

7. The method of claim 6, wherein each of the bindings is associated with a specific worker shift, and wherein at least one of the bindings is adjacent in time to the start or end of the associated worker shift.

8. The method of claim 7, wherein the plurality of bindings spans the time specified by a duration attribute of the schedulable object.

9. A system for workforce scheduling, comprising:
an instruction execution system configured to execute a user interface operative to create a shift alteration template describing allowable alterations to shift time ranges and to identify an association between the shift alteration template and one or more of a plurality of workers;
the instruction execution system configured to execute a scheduler operative to generate a second workforce schedule based on a first workforce schedule, wherein the second workforce schedule describes assignments of one or more workers to one or more of a plurality of shifts, and wherein the second workforce schedule comprises a modification of the length of one or more of the plurality of shifts assigned to a worker, and wherein each of the shifts are associated with a time range and a day, the scheduler comprising:
logic to create at least one schedulable object from the shift alteration template;
logic to create a domain of potential bindings for the at least one schedulable object based on the assignments in the first workforce schedule;
logic to select one of the potential bindings for association with the schedulable object; and
logic to modify the first workforce schedule by applying the selected binding to the schedulable object.

10. The system of claim 9, wherein the shift alteration template comprises information corresponding to overtime.

11. The system of claim 9, wherein the shift alteration template represents information corresponding to voluntary time-off.

12. The system of claim 9, wherein the schedulable object is associated with a specific worker shift, and wherein the schedulable object includes a duration attribute and a placement attribute derived from a corresponding template attribute.

13. The system of claim 9, wherein the plurality of bindings spans the time specified by a duration attribute of the schedulable object.

14. A computer-readable medium having a computer program stored thereon, the computer program comprising computer-executable instructions for performing a computer-executed method for workforce scheduling, the method comprising the steps of:
receiving a first workforce schedule describing existing assignments of each of a plurality of workers to one of more of a plurality of shifts;
receiving a shift alteration template describing allowable alterations to shift time ranges;
receiving an association between the shift alteration template and one or more of the plurality of workers;
creating a plurality of schedulable objects based on the shift alteration template;
creating a domain of potential bindings for each of the schedulable objects based on the existing assignments;
selecting one of the potential bindings for association with each of the schedulable objects, wherein the selected binding is optimal in meeting constraints and optimizing goals; and
applying each of the selected bindings to the associated schedulable object to produce a second workforce schedule that modifies the length of at least one of the plurality of shifts.

15. The computer-readable medium of claim 14, wherein the shift template indicates truncation of a shift.

16. The computer-readable medium of claim 14, wherein the shift template indicates extension of a shift.

17. The computer-readable medium of claim 14, wherein each of the schedulable objects is associated with a worker, and further comprising the step of:
ordering each of the schedulable objects by a worker preference option.

18. The computer-readable medium of claim 14, wherein each of the bindings is associated with a specific worker shift having a start time and an end time, and wherein the creating a domain of potential bindings step further comprises:
if an attribute of the schedulable object indicates shift extension, creating a binding having a start time at least as early as the associated worker shift start time, or having an end time at least as late as the associated worker shift end time; and
if an attribute of the schedulable object indicates shift truncation, creating a binding having a start time at least as late as the associated worker shift start time, or having an end time at least as early as the associated worker shift end time.

19. The computer-readable medium of claim 14, wherein each of the bindings is associated with a specific worker shift having a start time and an end time, and wherein the creating a domain of potential bindings step further comprises:
creating a binding that indicates the worker shift remains unchanged when this binding is selected.

20. The computer-readable medium of claim 14, wherein the creating a domain of potential bindings further comprises the step of:
creating a domain of potential bindings for each of the schedulable objects based on the schedule shift assignments, wherein the potential bindings are constrained by a set of work rules.

* * * * *